3,338,869
SILICONE-CARBONATE RESINS
Loren A. Haluska, Midland, Mich., assignor to Dow Corning Corporation, Midland, Mich., a corporation of Michigan
No Drawing. Filed Jan. 17, 1966, Ser. No. 520,903
7 Claims. (Cl. 260—46.5)

This invention relates to new and improved carbonate-containing silicone resins. More particularly it relates to carbonate-containing silicones which possess improved electrical and mechanical properties, high heat distortion temperatures and unusually high impact strengths.

By the term "carbonate-containing silicone resins" is meant silanes and siloxanes which possess characteristic carboxyl dioxy linkages

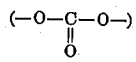

It is among the objects of this invention to provide new and improved carbonate-containing silicone resins. A further object of this invention is the preparation of carbonate-silicones via the platinum-catalyzed addition process of ≡SiH compounds to unsaturated materials in view of the availability of diallyl carbonate.

Still a further object of this invention is the provision of new and improved carbonate-silicones that will be particularly useful for electrical insulating purposes.

These and other objects will be evident from the following detailed description of the invention.

This invention relates to a silane of the general formula:

(A)    

wherein

R is any monovalent hydrocarbon or halohydrocarbon radical,

R' is any divalent hydrocarbon or hydrocarbon ether radical,

R'' is any monovalent hydrocarbon or halohydrocarbon radical,

X is any hydrolyzable substitutent or hydroxyl radical, and $n$ has a value of from 0 to 2 inclusive.

This invention also relates to a siloxane of the general formula (B)    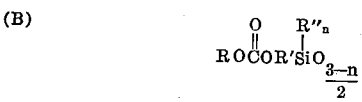

wherein R, R', R'', and $n$ are as defined above.

This invention further relates to a siloxane polymer containing at least one unit of the Formula B; any other units present being of the general formula

wherein

Z is a monovalent hydrocarbon or halohydrocarbon radical and $a$ has a value of from 0 to 3 inclusive.

Thus, for purposes of this invention, R in the above formulae can be any monovalent hydrocarbon or halohydrocarbon radical such as methyl, ethyl, propyl, isopropyl, butyl, isobutyl, t-butyl, dodecyl, octadecyl, myricyl, pentyl, isopentyl, hexyl, isohexyl, cyclohexyl, cyclopentyl, methylcyclohexyl, hexylcyclohexyl, cyclobutyl, cyclohexenyl, vinyl, allyl, methallyl, hexenyl, octadecenyl, β-phenylpropyl, β-phenylethyl, benzyl, chlorobenzyl, iodo-β-phenylpropyl, chloromethyl, chlorobutyl, bromopropyl, 3,3,3-trifluoropropyl, gamma-chloropropyl, (perfluoroethyl)ethyl, (perfluoropentyl)ethyl, (perfluorononyl)ethyl, iodophenyl, α,α,α-trifluorotolyl, perfluorocyclohexenyl, phenyl, tolyl, xylyl, ethylphenyl, mesityl, methyl-ethyl-phenyl, n-propylphenyl, propylphenyl, isopropylphenyl, diethylphenyl, propylmethylphenyl, ethyltrimethylphenyl, diethylmethylphenyl, hexylphenyl, cyclohexylmethylphenyl, amylmethylphenyl, butylethylphenyl, butyldimethylphenyl, propylethylmethylphenyl, diphenyl, dipropylphenyl, naphthyl, 1-methylnaphthyl, 2-methylnaphthyl, 1-ethylnaphthyl, 2-ethylnaphthyl, phenylnaphthyl, anthracyl, 9-methylanthracyl, 2,3-dimethylanthracyl, 2,4-dimethylanthracyl, 9-ethylanthracyl, bromophenyl, o-bromophenyl, o-bromotolyl, m-bromotolyl, p-bromotolyl, o-chlorotolyl, m-chlorotolyl, p-chlorotolyl, 2-chloro-m-fluorotolyl, 2,6-chlorotolyl, 4-bromo-o-xylyl, dichloroxylyl, 5-bromo-m-xylyl, 2-bromo-p-xylyl, 2-bromomesityl, 3-bromo-o-tolyl, 2-bromo-1-ethylphenyl, 4-bromo-1,3-diethylphenyl, 4-bromo-1-tertiary-butylphenyl, 6-bromo-3-ethyltolyl, 2-bromo-4-ethyltolyl, 4-bromo-1-propylphenyl, 4-bromo-1-isopropylphenyl, 4-bromo-1-methyl-3-isopropylphenyl, 4-bromo-1-tertiaryamylphenyl, chlorophenyl, alpha-bromophenyl, 2-chloronaphthyl, 1-bromo-3-chloronaphthyl, 2-chloro-1-methylnaphthyl, 1-bromo-8-methylnaphthyl, 1-bromo-2,3-dimethylnaphthyl, 1-bromo-4-methylnaphthyl, 1,10-dibromo-anthracyl, 9,10-dichloroanthracyl, phenanthryl, 3-methylphenanthryl, and 1,4-dimethylphenanthryl, among others.

R' can be any divalent hydrocarbon or hydrocarbon ether radical containing from 1 to 18 carbon atoms such as methylene, ethylene, propylene, hexylene, phenylene, isopropylene, xenylene, decylene, octadecylene, 2,5-octylene, biphenylene, naphthalene, 2-phenylpropylene, 2-phenylethylene, and

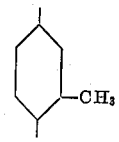

among others.

R'' can be any monovalent hydrocarbon of halohydrocarbon represented by the examples listed above for R.

X is defined as any hydrolyzable substituent or hydrolyzable radical. Therefore, R can be any alkoxy radical of from 1 to 4 carbon atoms such as methoxy, ethoxy, propoxy, isopropoxy, butoxy or isobutoxy; X can also be any halogen atom such as chlorine, bromine, fluorine, or iodine; X can also be any acyloxy radical such as acetoxy, propionate, butyrate, benzoate, or naphthanate; X can also be any oxime radical of the general formula $$(R_2C{=}N{-}O{-})$$

wherein R is a hydrocarbon radical of from 1 to 4 carbon atoms such as methyl, ethyl, propyl, isopropyl, butyl, and isobutyl; X can also be any aryloxy radical such as phenoxy, xyloxy, 2-phenylethyloxy, and naphthyloxy. In addition, X can also be any amine of the general formulae $(RNH-)$, $(NH_2-)$, and $(R_2N-)$, wherein R is as defined above.

Z can be any monovalent hydrocarbon or halohydrocarbon radical represented by the examples listed for R' above.

The silanes and siloxanes of this invention can be prepared by reacting a compound of the formula $$\underset{\underset{O}{\|}}{(RO\overset{}{C}OA)}$$

wherein R is as defined above and A is a terminally unsaturated halohydrocarbon or hydrocarbon radical with a silane or siloxane which contains silicon bonded hydrogen atoms. For example, the reaction can be represented by the following structural formulae:

(1)
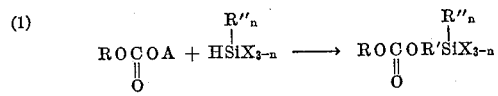

and (2)
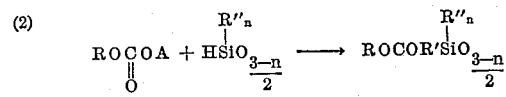

The siloxanes of this invention can also be prepared by hydrolyzing and condensing the novel silanes disclosed herein which contain X substituents that are hydrolyzable or hydroxyl radicals. Said hydrolysis and condensation reaction is well known in the art as revealed by numerous United States patents.

The preparation of the novel silanes and siloxanes of the present invention occurs in the presence of catalytic platinum, preferably in the form of chloroplatinic acid. The catalyst is employed with a solvent suitable for the purpose, such as xylene, hexane, and dimethyl phthalate among others, although xylene is to be preferred. Concentration of the catalytic platinum is not critical with the exception that a sufficient quantity must be used. Any amount in a range of from .25 to 10 percent chloroplatinic acid based on the weight of solvent can be effectively employed, although for best results, both from an economic and qualitative viewpoint, a 1 percent solution of chloroplatinic acid is preferred.

It is to be noted that the silanes and siloxanes of this invention can also be prepared by reacting a compound of the formula

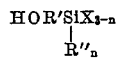

with the appropriate chloroformate to produce a compound of the formula

It is to be noted that in the above reaction, X is as previously described with the exception that it cannot be a halogen atom or other hydrolyzable radical that is reactive with the attached carbonate group. The above defined reaction is conducted in the presence of any of the commonly known HCl acceptors such as pyridine to form the salt of hydrochloric acid to prevent any reversibility in the reaction and to effectively dispense with the HCl that is necessarily evolved.

In all reactions disclosed herein, temperature is not critical, however elevated temperatures will accelerate the reaction. It is to be further noted that both pressure and proportion of the required reactants is likewise not critical. All reactions defined above are typified in the examples that follow.

The following examples are intended to aid those skilled in the art in understanding and practicing this invention. The examples do not delineate the scope of the invention.

Example 1

A 1 liter, 3-necked flask equipped with a stirrer, reflux condenser, thermometer, and dropping funnel was loaded with 183.3 grams of

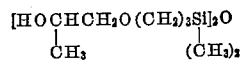

94.9 grams of pyridine, and 300 cc. of heptane. 138.7 grams of allylchloroformate was then added over a period of approximately one hour. The reaction mixture was cooled and 55.4 grams of allylchloroformate was completed. Strip distillation afforded 222.3 grams of the product

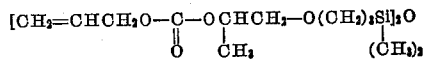

Example 2

When the following siloxanes are substituted for the siloxane of Example 1, the indicated products are obtained.

| | Siloxane | Product |
|---|---|---|
| (1) | [HOCH$_2$CH$_2$CH$_2$Si]$_2$O with CH=CH$_2$ and CH$_3$ groups | [CH$_2$=CHCH$_2$OCOOCH$_2$CH$_2$CH$_2$Si]$_2$O with CH=CH$_2$ and CH$_3$ groups |
| (2) | [HOCH$_2$CH$_2$CH$_2$Si]$_2$O with C$_6$H$_5$ (phenyl) and CH$_3$ groups | [CH$_2$=CHCH$_2$OCOOCH$_2$CH$_2$CH$_2$Si]$_2$O with C$_6$H$_5$ (phenyl) and CH$_3$ groups |
| (3) | [HOCH$_2$CHCH$_2$Si—O]$_2$—Si with OCH$_3$, CH$_3$, CH$_3$, OCH$_3$, CH$_3$ groups | [CH$_2$=CHCH$_2$OCOOCH$_2$CHCH$_2$Si—O]$_2$—Si with OCH$_3$, CH$_3$, CH$_3$, OCH$_3$, CH$_3$ groups |

Example 3

When the following formates are substituted for the allylchloroformate of Example 1, the following products are obtained.

| Formate | Product |
|---|---|
| (1) $ClCOO(CH_2)_3CH_3$ | $[CH_3(CH_2)_3O-\underset{\underset{O}{\|\|}}{C}-OCHCH_2-O(CH_2)_3Si]_2O$ <br> with $CH_3$ and $(CH_3)_2$ substituents |
| (2) $ClCOOCH_3$ | $[CH_3O-\underset{\underset{O}{\|\|}}{C}-OCHCH_2-O(CH_2)_3Si]_2O$ <br> with $CH_3$ and $(CH_3)_2$ substituents |
| (3) $ClCOOCl_3$ | $[CCl_3O-\underset{\underset{O}{\|\|}}{C}-OCHCH_2-O(CH_2)_3Si]_2O$ <br> with $CH_3$ and $(CH_3)_2$ substituents |

Example 4

A 1 liter, 3-necked flask equipped with a stirrer, reflux condenser, thermometer, and dropping funnel was loaded with 142.2 grams of diallyl carbonate and 3.0 grams of a 1 percent solution of $H_2PtCl_6$. The solution was heated to 132° C., and 129.2 grams of

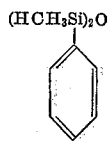
$(HCH_3Si)_2O$ was added. A strip distillation afforded 212.1 grams of the product

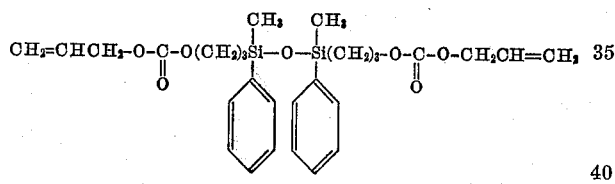
$CH_2=CHCH_2-O-\underset{\underset{O}{\|\|}}{C}-O(CH_2)_3\underset{\underset{}{\|}}{Si}-O-\underset{\underset{}{\|}}{Si}(CH_3)_3-O-\underset{\underset{O}{\|\|}}{C}-O-CH_2CH=CH_2$

Example 5

A 1 liter, 3-necked flask equipped with a stirrer, reflux condenser, thermometer and dropping funnel was loaded with 200 ml. of dry toluene, 5.0 grams of hydroquinone, 1.5 grams of N,N'-diphenyl, p-phenylenediamine, and 1.0 gram of a 1 percent solution of $H_2PtCl_6$ was dimethylphthalate. The mixture was heated to reflux temperature and a mixture of 142.1 grams of diallyl carbonate and 122.2 grams of $(CH_3O)_3SiH$ was added. Strip distillation afforded 82.4 grams of the product

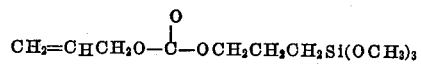
$CH_2=CHCH_2O-\underset{\underset{O}{\|\|}}{C}-OCH_2CH_2CH_2Si(OCH_3)_3$ a 31.1 percent yield of theory.

Example 6

When the following compounds are substituted for the corresponding compounds in Example 5, the indicated silanes are obtained.

| Carbonate | Silane | Resulting Silane |
|---|---|---|
| (1) $ClCH_2CH_2CH_2CH_2O\underset{\underset{O}{\|\|}}{C}OCH_2CH=CH_2$ | $HSiOH$ <br> $(CH_2CH_2CH_2Br)_2$ | $ClCH_2CH_2CH_2CH_2O\underset{\underset{O}{\|\|}}{C}OCH_2CH_2CH_2SiOH$ <br> $(CH_2CH_2CH_2Br)$ <br> $SiCl_2$ |
| (2) $CH_3CH_2CHOCOCH_2CH=CH_2$ (with phenyl) | $HSiCl_2$ <br> $CH_2CH_3$ (with phenyl) | $CH_3CH_2CHOCOCH_2CH_2CH_2CH_2CH_3$ (with phenyl) |
| (3) $CH_2OCOCH_2CH_2C=CH_2$ (with naphthyl and phenyl) | $HSi(O\underset{\underset{O}{\|\|}}{C}CH_3)_3$ | $CH_2OCOCH_2CH_2CHCH_3Si(O\underset{\underset{O}{\|\|}}{C}CH_3)_3$ (with naphthyl and phenyl) |
| (4) $CHCH_2CH_2CH_2CH_2CH_3$ (with naphthyl) <br> $O\underset{\underset{O}{\|\|}}{C}OCH_2CH_2CH=CH_2$ | $HSi[N(CH_3)_2]_3$ | $CHCH_2CH_2CH_2CH_2CH_2OCO$ (with naphthyl) <br> $CH_3CH_2CH_2CH_2CH_2Si[N(CH_3)_2]_3$ |

| Carbonate | Silane | Resulting Silane |
|---|---|---|
| (5) CH₂CH₂CH₂OCOCH₂CH₃ with p-tolyl and allyl substituents | HSi[O—N=C(CH₂CH₃)₂]₃ | CH₂CH₂CH₂OCOCH₂CH₂— with p-tolyl, then CH₂CH₂Si[—O—N=C(CH₂CH₃)₂]₃ |
| (6) CH₃CH₂CHCH₂OCOCH=CH₂ (CH₃ branch) | HSiOH(CH₂CH₂CF₃)₂ | CH₃CH₂CHCH₂OCOCH₂CH₂SiOH(CH₂CH₂CF₃)₂ |
| (7) CH₃CHCH₂O—C(=O)—OCH₂CH=CH₂ with naphthyl | HSiCl₂(C₁₈H₃₇) | CH₃CHCH₂O—C(=O)—OCH₂CH₂CH₂SiCl₂(C₁₈H₃₇) with naphthyl |
| (8) CH₃CH₂CH₂CH₂OC(=O)—OCH=CH₂ | HSiCl(phenyl)(CH=CH₂) | CH₃CH₂CH₂CH₂O—C(=O)—OCH₂SiCl(phenyl)(CH=CH₂) |
| (9) CH₂CH₂CHCH₂O—COCH₂CH₂CH=CH₂ with phenyl, CH₃ | HSiCl₂(CH₃) | CH₂CH₂CHCH₂O—C(=O)—OCH₂CH₂CH₂CH₂SiCl₂(CH₃) with phenyl |
| (10) CH₃CH₂O—C(=O)—OCH=CH₂ | HSiOH(phenyl)(CH₂CH₃) | CH₃CH₂O—C(=O)—OCH₂CH₂SiOH(phenyl)(CH₂CH₃) |
| (11) CH₃CH₂CH₂O—C(=O)—OCH=CH₂ | HSiCl(CH₃)(CH₂CH₂CH₃) | CH₃CH₂CH₂O—C(=O)—OCH₂CH₂SiCl(CH₃)(CH₂CH₂CH₃) |

Example 7

When the following compounds are substituted for the corresponding compounds in Example 4, the indicated siloxanes are obtained.

| Carbonate | Siloxane | Resulting Siloxane |
|---|---|---|
| (1) Cl₂CHCH₂CH₂OCOCH₂CH=CH₂ (CH₃ branch) | HSiO(CHCH₂CH₃)(Cl) | Cl₂CHCH₂CH₂OCOCH₂CH₂CH₂SiO (CH₃ branch)(CHCH₂CH₃)(Cl) |
| (2) CH₃CHCH₂CH₂CH₂CH₂OCOCH₂CH₂CH=CH₂ with p-tolyl | HSiO₁/₂ with Br(CH₂CH₂CH₂CH₂)₂ | CH₃CHCH₂CH₂CH₂CH₂OCOCH₂CH₂CH₂CH₂SiO₁/₂ with p-tolyl, (H₂CH₂CH₂CH₂C)₂ Br |

| Carbonate | Siloxane | Resulting Siloxane |
|---|---|---|
| 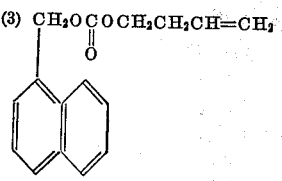 (3) | 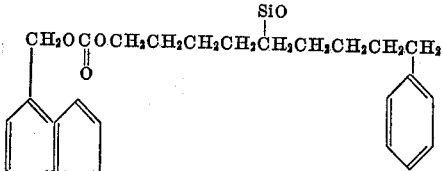 | 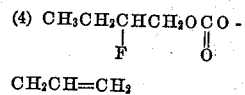 |
| (4) CH₃CH₂CHCH₂OCO-<br>            F       O<br>CH₂CH=CH₂ | HSiO₃/₂ | CH₃CH₂CHCH₂OCOCH₂CH₂-<br>            F       O<br>CH₂SiO₃/₂ |
| (5) 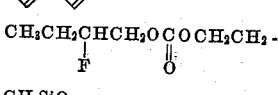 | 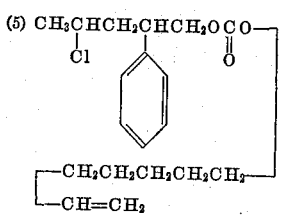 | 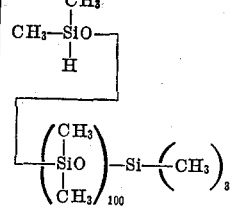 |
| (6) CH₃CH₂CH₂O—C—O-<br>                  ‖<br>                  O<br>CH₂CH=CH₂ | 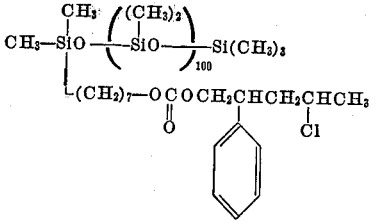 | 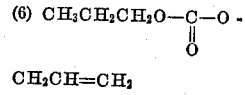 |
| (7) CH₃CHCH₂O—C—O-<br>      CH₃   ‖<br>                O<br>CH=CH₂ | 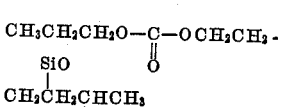 | CH₃CHCH₂O—C—OCH₂CH₂-<br>    CH₃    ‖<br>            O<br>SiO<br>C₁₂H₂₅ |
| (8) CH₃CH₂CH₂CH₂CH₂-O-C-O-CH₂CH₂CH=CH₂<br>                          ‖<br>                          O | 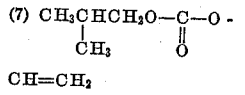 | CH₃CH₂CH₂CH₂CH₂O—C—O -<br>                               ‖<br>                               O<br>CH₂CH₂CH₂CH₂SiO<br>C₁₄H₂₉ |

*Example 8*

When the following siloxane is substituted for the siloxane of Example 1, the indicated product is obtained:

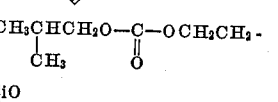 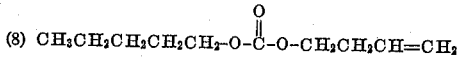

That which is claimed is:

1. A silicon containing material selected from the group consisting of, (1) silanes of the formula

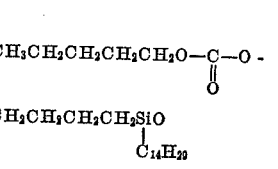

(2) siloxanes of the formula

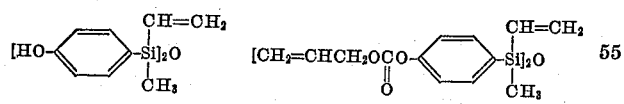, and (3) a siloxane copolymer containing at least one unit of the formula

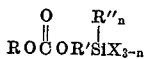

the remaining units present being of the formula $Z_aSiO_{\frac{4-a}{2}}$ in above said formulae R is a monovalent hydrocarbon or halohydrocarbon radical, R′ is a divalent hydrocarbon radical containing from 1 to 18 carbon atoms or hydrocarbon ether radical containing from 1 to 18 carbon atoms and containing one oxygen atom, R″ is a monovalent hydrocarbon or halohydrocarbon radical, X is any hydrolyzable substituent or hydroxyl radical, Z is a monovalent hydrocarbon or halohydrocarbon radical, n has a value of from 0 to 2 inclusive, and a has a value of from 0 to 3 inclusive.

2. A silicon containing material as recited in claim 1 which is a silane of the Formula 1.

3. A silicon containing material as recited in claim 2 which is a silane of the formula

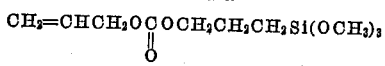

4. A silicon containing material as recited in claim 1 which is a siloxane of the Formula 2.

5. A silicon containing material as recited in claim 4 which is a siloxane of the formula

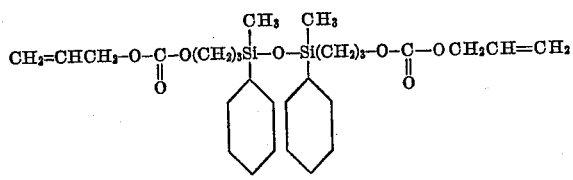

6. A silicon containing material as recited in claim 1 which is a siloxane polymer of the Formula 3.

7. A silicon containing material as recited in claim 6 which is a siloxane polymer of the formula

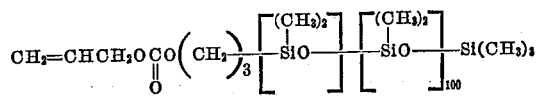

References Cited

FOREIGN PATENTS

| | | |
|---|---|---|
| 607,440 | 7/1960 | Canada. |
| 822,101 | 11/1961 | Great Britain. |
| 941,957 | 11/1963 | Great Britain. |
| 949,126 | 2/1964 | Great Britain. |
| 955,916 | 4/1964 | Great Britain. |

DONALD E. CZAJA, *Primary Examiner.*

LEON J. BERCOVITZ, *Examiner.*

M. I. MARQUIS, *Assistant Examiner.*